(No Model.)
J. J. DIMOND.
GANG SAW FOR MARBLE SLABS.
No. 580,259. Patented Apr. 6, 1897.
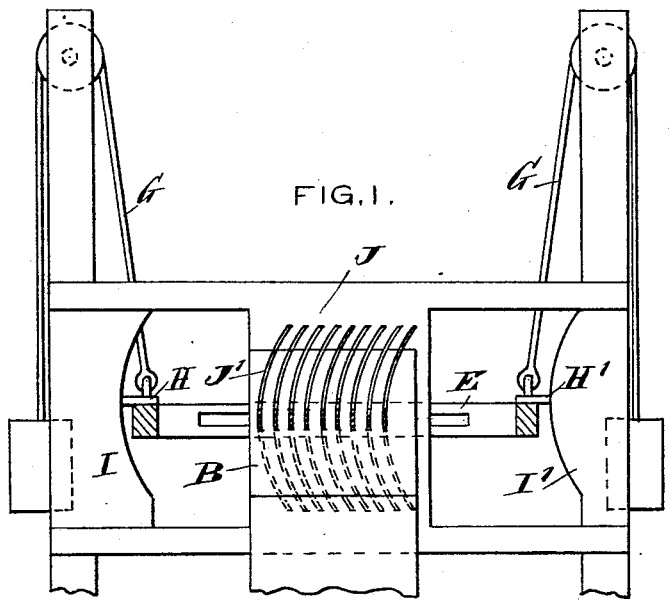
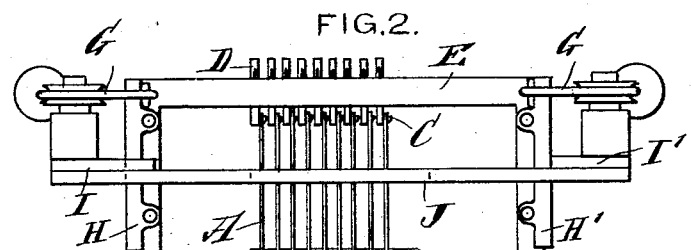
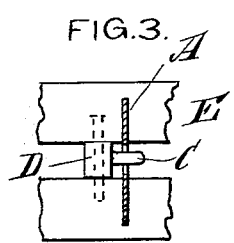
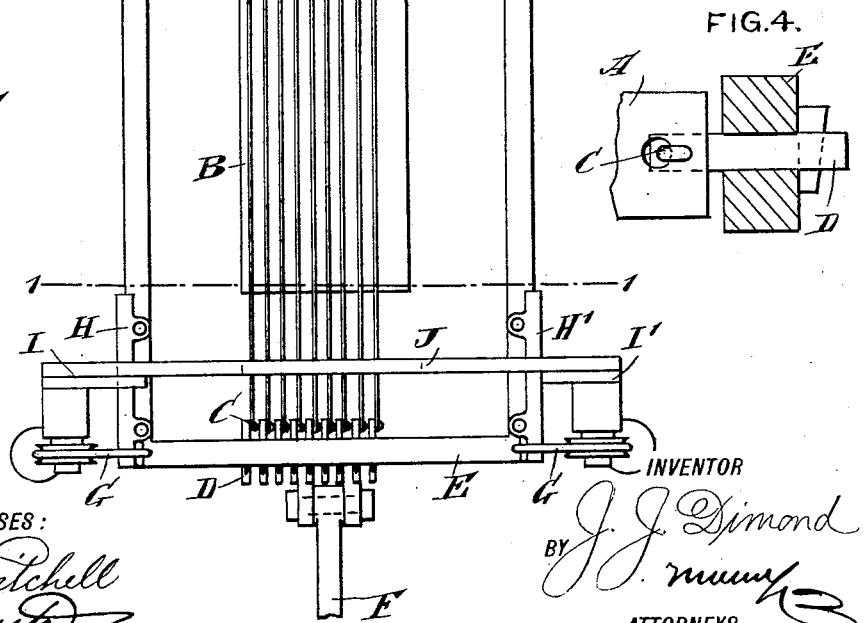
WITNESSES:
Donn Twitchell
INVENTOR
J. J. Dimond
BY
ATTORNEYS.

UNITED STATES PATENT OFFICE.

JOHN J. DIMOND, OF NEW YORK, N. Y.

GANG-SAW FOR MARBLE SLABS.

SPECIFICATION forming part of Letters Patent No. 580,259, dated April 6, 1897.

Application filed August 1, 1896. Serial No. 601,354. (No model.)

*To all whom it may concern:*

Be it known that I, JOHN J. DIMOND, of New York city, in the county and State of New York, have invented a new and Improved Gang-Saw for Marble Slabs, of which the following is a full, clear, and exact description.

The invention relates to stone-working machinery; and its object is to provide certain new and useful improvements in gang-saws for sawing slabs of marble of various forms for marble blocks, wood, or other material, and by the use of the ordinary saw-blades.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement on the line 1 1 of Fig. 2. Fig. 2 is a plan view of the same. Fig. 3 is an enlarged sectional side elevation of the saw-blade and the fastening device therefor, and Fig. 4 is a front elevation of the same with the saw-frame in section.

The series of saw-blades A for forming part of the gang-saw for sawing a block of marble B into slabs of various forms have their individual saws hung at their ends on hooks C to permit each saw-blade to swing or turn sidewise to follow the cut to be made. Each of the hooks C is held on a bar D, adjustably arranged in the end of the saw-frame E, connected by a pitman F in the usual manner with suitable machinery for imparting a reciprocating motion to the said saw-frame, so as to cause the series of saws A to cut the block B of marble into several slabs, according to a predetermined pattern. The reciprocating saw-frame E is counterbalanced by means of weighted ropes G to permit the saws to feed themselves by their own weight into the material to be cut, and the vertical movement of the saw-frame is controlled by keepers H H', secured on the sides of the saw-frame and in contact with pattern-guides I I', respectively, held stationary on the frame of the machine. Thus, for instance, as shown in Fig. 1, the pattern-guides are segments on which follow the keepers H H' for shifting the saw-frame E sidewise during the vertical movement, so as to cause the saws A to make cuts in the marble block B, according to the shape of the said pattern-guides I I'. Now in order to cause the saws A to conform to the cut to be made I guide the same in a guide J, held stationary on the ends of the framework of the machine, each guide being formed with transverse slots J', corresponding to the shape of the pattern-guides I I', so that the said saws while passing through the guides J accommodate themselves to the form of the grooves or slots J' and turn sidewise, according to the shape of the cut to be made.

It is understood that as each saw-blade is hung at its ends on the hooks C it is evident that the said saw-blades readily turn, according to the shape of the slots J', so that the said saw-blades will always cut properly in the block, according to the cut desired to be made.

Now by the arrangement described it will be seen that an entire block B of marble or other material is cut into slabs according to a predetermined pattern, the slabs being all alike in shape. By the arrangement described the ordinary saw-blades now used in gang-saws for sawing marble blocks can be used, especially as the said saws have to follow the shape of the slots J' to cause the saws to cut properly into the block, according to the shape desired to be given to the individual slabs.

Having thus fully described my invention, I claim as new and desire to secure by Letters Patent—

1. A gang-saw provided with a reciprocating saw-frame, saw-blades held to turn therein, pattern-guides for the said saw-frame to guide the latter in its vertical movement, and guides for the saw-blades, said latter guides being placed between the sides of said frame and adapted to govern the position of each saw-blade relative to the cuts to be made thereby, substantially as shown and described.

2. In a gang-saw, a reciprocating frame provided with adjustable bars secured in the end pieces thereof, hooks on said bars, saw-blades attached at their ends to said hooks, whereby each blade is permitted to swing or turn laterally, pattern-guides arranged on each side of said saw-frame, keepers secured on the sides of said frame and adapted to contact with said pattern-guides and control the vertical movement of said frame, and a guide for said saw-blades, the latter guide being formed with transverse slots corresponding to the shape of said pattern-guides and adapted to receive said saw-blades whereby the blades accommodate themselves to the shape of the cut to be made, substantially as shown and described.

3. The combination in a gang-saw with the reciprocating saw-frame, of the pattern-guides secured at each side of said frame, keepers on said frame and arranged to contact with said pattern-guides, the series of saws adjustable on said frame and having free lateral movement and a guide for said saws, said latter guide being formed with transverse slots arranged to receive said saws and control their movement, substantially as shown and described.

JOHN J. DIMOND.

Witnesses:
 THEO. G. HOSTER,
 JNO. M. RITTER.